United States Patent
Lesellier et al.

(10) Patent No.: US 7,373,010 B2
(45) Date of Patent: May 13, 2008

(54) METHOD AND DEVICE FOR POST-PROCESSING DIGITAL IMAGES

(75) Inventors: Estelle Lesellier, Boulogne (FR); Jorge E. Caviedes, Yorktown Heights, NY (US); Carolina Miro Sorolla, Villecresnes (ES)

(73) Assignee: Koninklijke Philips Electronics N.V., Eindhoven (NL)

( * ) Notice: Subject to any disclaimer, the term of this patent is extended or adjusted under 35 U.S.C. 154(b) by 737 days.

(21) Appl. No.: 10/474,112

(22) PCT Filed: Apr. 8, 2002

(86) PCT No.: PCT/IB02/01250

§ 371 (c)(1),
(2), (4) Date: Oct. 7, 2003

(87) PCT Pub. No.: WO02/084593

PCT Pub. Date: Oct. 24, 2002

(65) Prior Publication Data

US 2004/0105592 A1  Jun. 3, 2004

(30) Foreign Application Priority Data

Apr. 10, 2001  (FR) ................... 01 04862

(51) Int. Cl.
*G06K 9/40* (2006.01)
(52) U.S. Cl. .................. 382/254; 382/263; 382/264; 382/268

(58) Field of Classification Search ........... 382/268, 382/266, 275, 254, 250, 264, 280
See application file for complete search history.

(56) References Cited

U.S. PATENT DOCUMENTS

| | | | | |
|---|---|---|---|---|
| 5,109,451 A | * | 4/1992 | Aono et al. | 382/166 |
| 5,737,019 A | * | 4/1998 | Kim | 375/240.25 |
| 5,737,450 A | * | 4/1998 | Hajjahmad et al. | 382/260 |
| 5,774,599 A | * | 6/1998 | Muka et al. | 382/254 |
| 5,870,505 A | * | 2/1999 | Wober et al. | 382/274 |
| 5,881,180 A | * | 3/1999 | Chang et al. | 382/268 |
| 5,920,654 A | * | 7/1999 | Someya et al. | 382/270 |

FOREIGN PATENT DOCUMENTS

WO  WO9729594  8/1997

* cited by examiner

*Primary Examiner*—Samir Ahmed
*Assistant Examiner*—Michael A Newman

(57) ABSTRACT

A method of post-processing digital images frequency transforming a set of the pixels to a set of transformed coefficients; extracting original low-frequency coefficients and original high-frequency coefficients from the set of transformed coefficients; correcting the original low-frequency coefficients and the original high-frequency coefficients for delivering a set of corrected transformed coefficients including corrected low-frequency coefficients and corrected high-frequency coefficients; and combining the set of corrected transformed coefficients and the original high-frequency coefficients for delivering a set of combined transformed coefficients. The set of combined transformed coefficients are inverse frequency transformed for delivering a processed set of pixels that are ready for display on a screen.

11 Claims, 2 Drawing Sheets

METHOD AND DEVICE FOR POST-PROCESSING DIGITAL IMAGES

FIELD OF THE INVENTION

The invention relates to a method and a device for post-processing digital images comprising pixels.

The invention also relates to a computer program product for performing such a post-processing method.

The invention notably finds its application in the correction of digital images that have previously been encoded and subsequently decoded in accordance with a block-based encoding technique, for example, the MPEG standard, so as to attenuate visual artifacts caused by the block-based encoding technique.

BACKGROUND OF THE INVENTION

International patent application WO 97/29594 describes a method and a device for post-processing decoded video data so as to minimize the blocking artifacts in an image without affecting the contrast.

To this end, the method of post-processing data in accordance with the prior art, described in FIG. 1, comprises the steps of:

LPF filtering (11) decoded video data (x), suitable for delivering filtered data (xf), DCT transform (12,13) of the filtered data and the decoded video data, suitable for delivering transformed filtered data (Xf) and transformed decoded data (X), adjusting ADJ (14) the low-frequency coefficients comprised in the transformed filtered data, suitable for delivering adjusted low-frequency coefficients (Xbf), combining (16) the high-frequency coefficients (Xhf) comprised in the transformed decoded data and the adjusted low-frequency coefficients, suitable for delivering combined transformed data (Xc), and IDCT transform (17) of the combined transformed data, suitable for delivering processed data (xc) that are ready for display on a screen.

This method of post-processing decoded video data necessarily comprises a low-pass filtering step for filtering the high-frequency components. This method allows extraction, in the spatial domain, of the low-frequency data on which a first DCT transform and an adjustment are applied in order to deliver adjusted low-frequency coefficients. The high-frequency coefficients are extracted (15) by way of a second DCT transform of the decoded video data. Thus, one part of the data-processing method is realized in the spatial domain, which renders the method both complex to be carried out and costly in terms of computing.

Moreover, a low-frequency coefficient comprised in the transformed filtered data is adjusted within the interval $[Xq-q/2, Xq+q/2]$, where $Xq$ is the value of said quantized low-frequency coefficient and $q$ is the value of the quantization step, so that such a method necessitates access to the encoding parameters, which is not always possible.

OBJECT AND SUMMARY OF THE INVENTION

It is an object of the present invention to provide a method of post-processing decoded video data, which can be performed in a simple and economical manner.

To this end, the method of post-processing digital images according to the invention is characterized in that it comprises the steps of:

frequency transformation, suitable for delivering a set of transformed coefficients from a set of pixels, extraction of original low-frequency coefficients and original high-frequency coefficients comprised in the set of transformed coefficients, correction, suitable for delivering a set of corrected transformed coefficients from the original low-frequency coefficients, and combination, suitable for delivering a set of combined transformed coefficients from the original high-frequency coefficients and from the set of corrected transformed coefficients.

In such a post-processing method, data are processed, and particularly the original high and low-frequency coefficients are separated, in the frequency domain. The post-processing method can therefore be carried out in a simpler manner because the original low-frequency coefficients are solely extracted and corrected via the transformed coefficients. Consequently, neither the step of low-pass filtering in the spatial domain, nor a double frequency transformation of the filtered data and the decoded video data is necessary.

Said method is particularly adapted if the frequency transformation step uses the same type of frequency transformation as that used in the technique of block-encoding during a previous encoding of video data, for example, a DCT transform in the case of data that have previously been encoded and subsequently decoded in accordance with the MPEG standard. It also allows better control of the correction of blocking artifacts.

In addition, the post-processing method is more effective, particularly when a first half of the set of transformed coefficients constitutes the original low-frequency coefficients and a second half of said set constitutes the original high-frequency coefficients.

It is also a very flexible method as regards the restitution of the high frequencies in the image, wherein the combination step can linearly combine corrected transformed high-frequency coefficients and original high-frequency coefficients so as to deliver the set of combined transformed coefficients.

BRIEF DESCRIPTION OF THE DRAWINGS

These and other aspects of the invention are apparent from and will be elucidated, by way of non-limitative example, with reference to the embodiments described hereinafter.

In the drawings.

DESCRIPTION OF PREFERRED EMBODIMENTS

The present invention relates to a method of post-processing digital images that have previously been encoded and subsequently decoded in accordance with a block-based encoding technique and therefore comprise blocking artifacts. As will be described hereinafter, the method of post-processing video data according to the invention is intended to determine:

- the original high-frequency coefficients that must be preserved within a block of transformed coefficients so as to maintain the details of the image, such as contours, as well as
- the original low-frequency coefficients that must be corrected so as to effectively suppress the blocking artifacts.

Figure 1:
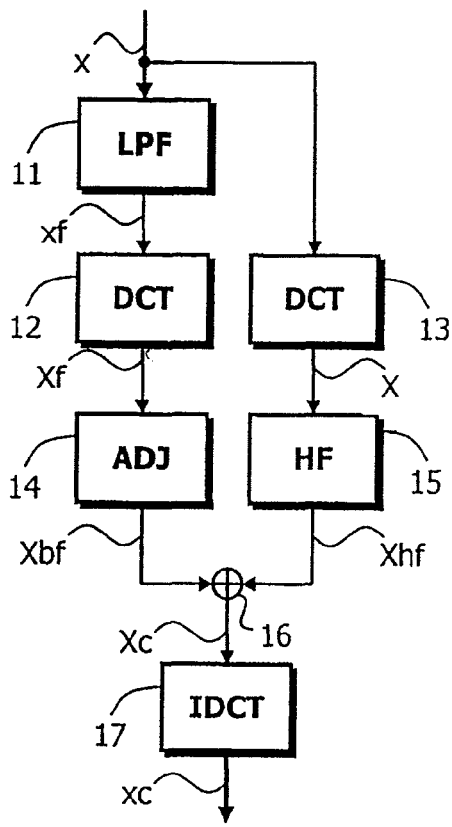
FIG. 1 illustrates the method of post-processing data in accordance with the prior art.
Figure 2:
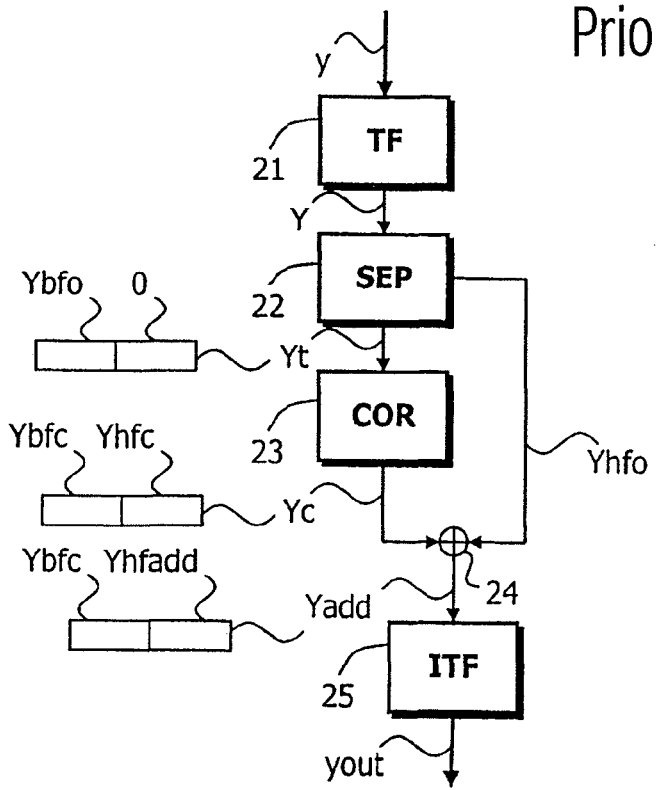
FIG. 2 is a diagram showing the principal steps of the method of post-processing data according to the invention.

FIG. 2 shows diagrammatically the principal steps of the method of post-processing decoded video data according to the invention. This method comprises the steps of:

- frequency transformation TF (21), suitable for delivering a set of transformed coefficients (Y) from a set of pixels (y),
- extraction SEP (22) of original low-frequency coefficients (Ybfo) and original high-frequency coefficients (Yhfo) comprised in the set of transformed coefficients,
- correction COR (23), suitable for delivering a set of corrected transformed coefficients (Yc) from the original low-frequency coefficients,
- combination (24), suitable for delivering a set of combined transformed coefficients (Yadd) from the original high-frequency coefficients and from the set of corrected transformed coefficients, and
- inverse frequency transformation ITF (25) of the set of combined transformed coefficients, suitable for delivering a processed set of pixels (yout) that are ready for display on a screen.

The set of pixels is preferably a segment of N pixels, with N=8 in the case of the MPEG standard for which the encoding blocks generally comprise 8 rows of 8 pixels. The set of pixels may be alternatively constituted by either an entire or a partial encoding block. The frequency transformation step preferably uses a transformation of the DCT type which is particularly adapted to the MPEG standard.

In the preferred embodiment, a segment of pixels is transformed in the transformation step into a segment of DCT coefficients. Subsequently, a first half of the segment of DCT coefficients, i.e. the first 4 DCT coefficients constituting the original low-frequency coefficients (Ybfo), and a second half of the segment of DCT coefficients, i.e. the last 4 DCT coefficients constituting the original high-frequency coefficients (Yhfo), are extracted in the extraction step. Such a separation into two parts of the segment of DCT coefficients allows a better correction of blocking artifacts. It may also be easily adjusted optimally as compared with the prior-art technique, which necessitates the optimal adjustment of a low-pass filter from an infinite number of available filters.

The extraction step (22) also comprises a truncation sub-step during which the first 4 DCT coefficients are completed by 4 zero coefficients so as to deliver a segment of truncated DCT coefficients. This truncation sub-step is in a way similar to a low-pass filtering operation. In the correction step (23), the segments of truncated coefficients are then corrected so as to deliver a segment of corrected DCT coefficients comprising 4 corrected low-frequency DCT coefficients (Ybfc) and 4 corrected high-frequency DCT coefficients (Yhfc). In the combination step (24), the 4 original high-frequency coefficients and the segment of corrected DCT coefficients are combined so as to deliver a segment of combined DCT coefficients (Yadd).

In a particularly advantageous embodiment, the segment of combined DCT coefficients corresponds to the concatenation of the 4 corrected low-frequency DCT coefficients (Ybfc) and the 4 original high-frequency coefficients (Yhfo). In the preferred embodiment, the segment of combined DCT coefficients corresponds to the concatenation of the 4 corrected low-frequency DCT coefficients (Ybfc) and the 4 combined high-frequency DCT coefficients, resulting in a linear combination of the 4 corrected high-frequency DCT coefficients (Yhfc) and the 4 original high-frequency coefficients (Yhfo), namely:

$$Yhfadd = a.Yhfc + (1-b).Yhfo$$

where a and b are real values between 0 and 1, with, for example, a=1/2 and b=a/4 if Yhfc differs from 0 and b=1/2 if Yhfc is equal to 0. Such a combination gives more weight to the original high-frequency coefficients, if high frequencies appear in the corrected DCT coefficients, and introduces an attenuation in the opposite case.

The segment of combined DCT coefficients is finally transformed in the spatial domain via an IDCT transform, which delivers a segment of processed pixels (yout) for display on a screen.

The method of post-processing data also comprises at least a horizontal processing of an image, associated with at least a vertical processing of said image. Indeed, the blocking artifacts may be present at the borders of an encoding block, that is, in the four segments delimiting the block vertically or horizontally. If the image is processed horizontally, vertical blocking artifacts will be corrected; conversely, horizontal blocking artifacts will be corrected if the image is processed vertically. The method of post-processing data is successively applied to each of the two fields constituting a frame if the image is composed of two fields. It is preferably applied to luminance data in the digital image.

The correction step which is carried out is based on the numerous blocking artifact correction methods that are known to those skilled in the art, and preferably those methods that do not use decoding parameters, which parameters are not always accessible.

In the preferred embodiment, the data correction method is referred to as DFD method (DCT Frequency Deblocking). Such a data correction method comprises the following steps, shown in FIG. 3, namely:

- a step of computing a first discrete cosine transform DCT1 (31) of a first segment (u) of N pixels, with N=8 in the example used, resulting in a first transformed segment U,
- a step of computing a first discrete cosine transform DCT1 (32) of a second segment (v) of N pixels, which second segment is adjacent to the first, resulting in a second transformed segment V, a step of determining (33) a predicted maximum frequency (kpred) as a function of the maximum frequencies ku and kv of U and V, as follows:

$$kpred = 2.\max(ku, kv) + 2$$

with $ku = \max(k \in \{0, \ldots, N-1\}/U(k) \neq 0)$,
$kv = \max(k \in \{0, \ldots, N-1\}/V(k) \neq 0)$, and
max is the function giving the maximum of k among a set of determined values, a step of processing (35) a concatenated segment (w) comprising 2N pixels, i.e. 16 pixels in our case, and corresponding to the concatenation (34) of the first (u) and the second (v) segment, this processing step comprising the following sub-steps of:

computing a second discrete cosine transform DCT2 (36) of the concatenated segment (w), resulting in a transformed concatenated segment W, correction (37) by setting those transformed data W(k) to zero that have an odd frequency k which is higher than the predicted maximum frequency (kpred), delivering a corrected transformed concatenated segment Wc, computing an inverse discrete cosine transform IDCT2 (38) of the corrected transformed segment Wc, delivering a corrected concatenated segment (cw).

In a preferred embodiment of the invention, filtering thresholds are introduced in accordance with the following principle:

$$kumax = \max(k \in \{0, \ldots, N-1\}/abs(U(k)) > T)$$

$$kvmax = \max(k \in \{0, \ldots, N-1\}/abs(V(k)) > T)$$

where T is a threshold different from zero.

In the determination step (33), a more precise predicted maximum frequency (kpred) is computed from the introduction of the threshold T, which allows a more effective correction of the blocking artifacts. The value of the threshold T is a function of the size of the segments u and v. Indeed, a part solely consisting of pixels of the segments u and v may be processed, for example, the pixels of either the even or the odd rows.

The correction step COR (37) preferably comprises a sub-step of detecting natural contours from the values of the pixels of the initial segments u and v and the transformed segments U and V. This sub-step allows distinction of the natural contours of the blocking artifacts. A natural contour is detected if two conditions are met:

the average values of the pixels of the segments u and v on both sides of a border between blocks differ by a considerable value which is higher than a predetermined threshold M, the segments u and v have a low spatial activity, which becomes manifest by the fact that the values ku and kv are small and less than a predetermined value k0.

Figure 3:
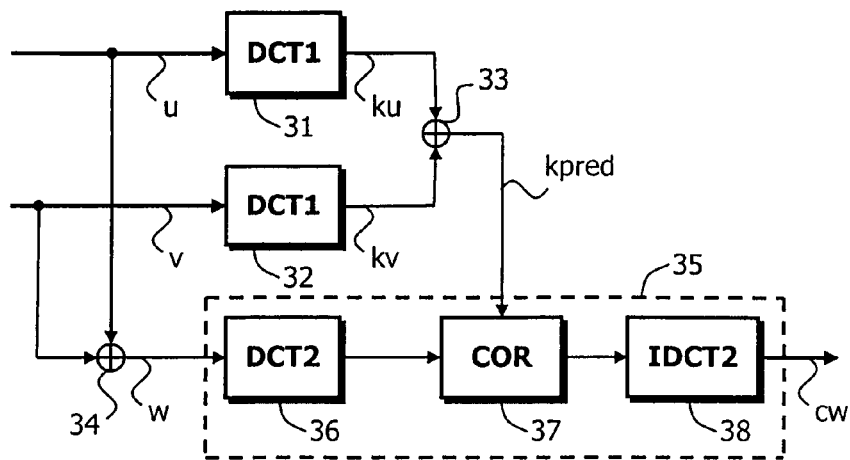
FIG. 3 illustrates a method of correcting blocking artifacts.
Figure 4:
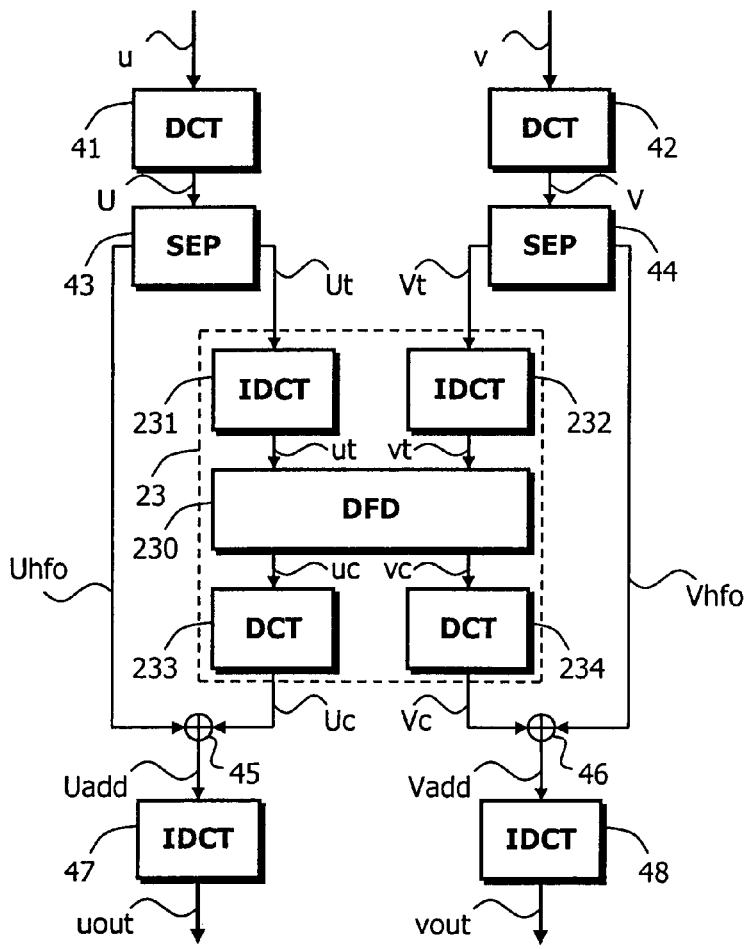
FIG. 4 is a diagram showing an embodiment of the method of post-processing data according to the invention, comprising such a step of correcting blocking artifacts.

FIG. 4 is a diagram showing an embodiment of the method of post-processing data according to the invention, including the DFD method of correcting blocking artifacts as described with reference to FIG. 3. Such a method of post-processing video data comprises the steps of:

DCT transform (41), suitable for delivering a first segment of DCT coefficients (U) from a first set of pixels (u), DCT transform (42), suitable for delivering a second segment of DCT coefficients (V) from a second set of pixels (v) adjacent to the first segment of pixels, extracting (43) first original low-frequency coefficients (Ubfo) and first original high-frequency coefficients (Uhfo) comprised in the first segment of DCT coefficients (U), suitable for delivering a first segment of truncated DCT coefficients (Ut) comprising the first original low-frequency coefficients, extracting (44) second original low-frequency coefficients (Vbfo) and second original high-frequency coefficients (Vhfo) comprised in the second segment of DCT coefficients (V), suitable for delivering a second segment of truncated DCT coefficients (Vt) comprising the second original low-frequency coefficients, correction (23), suitable for delivering a first and a second segment of corrected DCT coefficients (Uc,Vc, respectively) from the first and second original low-frequency coefficients (Ubfo,Vbfo, respectively), comprising the sub-steps of:

IDCT transform (231) of the first segment of truncated DCT coefficients (Ut), intended to deliver a first segment of a preprocessed pixel (ut), IDCT transform (232) of the second segment of truncated DCT coefficients (Vt), intended to deliver a second segment of a preprocessed pixel (vt), DFD correction (230) of the segments of preprocessed pixels in accordance with the principle described with reference to FIG. 3, suitable for delivering segments of corrected pixels (uc,vc), DCT transform (233) of the first segment of corrected pixels (uc), suitable for delivering a first segment of corrected DCT coefficients (Uc), DCT transform (234) of the second segment of corrected pixels (vc), suitable for delivering a second segment of corrected DCT coefficients (Vc), combination (45), suitable for delivering a first segment of combined DCT coefficients (Uadd) from the first original high-frequency coefficients (Uhfo) and the first segment of corrected DCT coefficients (Uc), combination (46), suitable for delivering a second segment of combined DCT coefficients (Vadd) from the second original high-frequency coefficients (Vhfo) and the second segment of corrected DCT coefficients (Vc), IDCT transform (47) of the first segment of combined DCT coefficients (Uadd), suitable for delivering a first segment of processed pixels (uout) for display on a screen, and IDCT transform (48) of the second segment of combined DCT coefficients (Vadd), suitable for delivering a second segment of processed pixels (vout), adjacent to the first segment of processed pixels (uout), for display on a screen.

The post-processing method described with reference to FIG. 4 has the advantage that it does not degrade the quality of the images that do not originally comprise any blocking artifacts. Indeed, in the presence of such images, the original low-frequency coefficients are not subjected to any modification because the DFD correction method used and the combined high-frequency DCT coefficients remain identical to the original high-frequency coefficients. In the prior-art technique, the use of a low-pass filter in the spatial domain may, on the other hand, lead to a degradation of the quality of an image that does not originally comprise any blocking artifact.

The invention may be realized in the form of software embedded on one or several circuits performing the method of post-processing data described hereinbefore, or in the form of items of hard ware. A device for post-processing digital images, corresponding to said method, is represented again by the functional blocks of FIG. 2. It comprises:

frequency transformation means TF (21), suitable for delivering a set of decoded transformed coefficients (Y) from a set of pixels (y), means SEP (22) for extracting original low-frequency coefficients (Ybfo) and original high-frequency coefficients (Yhfo) comprised in the set of transformed coefficients, correction means COR (23), suitable for delivering a set of corrected transformed coefficients (Yc) from the original low-frequency coefficients, and combination means (24), suitable for delivering a set of combined transformed coefficients (Yadd) from the original high-frequency coefficients and from the set of corrected transformed coefficients, and means ITF (25) for inverse frequency transformation of the set of combined transformed coefficients, suitable for delivering a set of processed pixels (yout) that are ready for display on a screen.

Such a post-processing device can be inserted between a video decoder and a television receiver in order to post-process decoded digital images and to display the post-processed digital images on the television receiver. Such a device can be built independently. It can also be part of the video decoder or of the television receiver.

There are numerous ways of implementing the previously described functions by means of software. In this respect, FIGS. 2 to 4 are very diagrammatic. Therefore, although a Figure shows different functions in the form of separate blocks, it does not exclude the fact that a single piece of software performs several functions. This neither excludes the fact that a function can be performed by a set of software. It is possible to implement these functions by means of a suitably programmed video decoder circuit, a set top box, or a television receiver. A set of instructions comprised in a programming memory may cause the circuit to perform the different operations described hereinbefore with reference to FIGS. 2 and 4. The set of instructions may also be loaded into the programming memory by reading a record carrier such as, for example, a disc comprising the set of instructions. Reading may alternatively be effected through a communication network such as, for example, the Internet. In this case, a service provider will put the set of instructions at the disposal of those interested.

Any reference sign placed between parentheses in this text shall not be construed as limiting the claim. Use of the verb "comprise" and its conjugations does not exclude the presence of elements or steps other than those stated in the claims. Use of the article "a" or "an" preceding an element or a step does not exclude the presence of a plurality of such elements or steps.

The invention claimed is:

1. A method of post-processing digital images comprising pixels, the method comprising the acts of:
    frequency transforming a set of the pixels to a set of transformed coefficients,
    extracting original low-frequency coefficients and original high-frequency coefficients from the set of transformed coefficients,
    correcting the original low-frequency coefficients for delivering a set of corrected transformed coefficients including corrected low-frequency coefficients, and
    combining the set of corrected transformed coefficients and the original high-frequency coefficients for delivering a set of combined transformed coefficients by giving more weight to the original high-frequency coefficients if high frequencies appear in the set of corrected transformed coefficients, and introducing an attenuation to the original high-frequency coefficients if the high frequencies do not appear in the set of corrected transformed coefficients.

2. The method of claim 1, wherein the extracting act is suitable for extracting a first half of the set of transformed coefficients as being the original low-frequency coefficients and a second half of the set of transformed coefficients as being the original high-frequency coefficients.

3. The method of claim 1, wherein the combining act is suitable for linearly combining corrected high-frequency coefficients included in the set of corrected transformed coefficients and the original high-frequency coefficients so as to deliver the set of combined transformed coefficients.

4. A device for post-processing digital images comprising pixels, the device comprising:
    frequency transformation means for transforming a set of the pixels to a set of transformed coefficients,
    means for extracting original low-frequency coefficients and original high-frequency coefficients from the set of transformed coefficients,
    correction means for correcting the original low-frequency coefficients for delivering a set of corrected transformed coefficients including corrected low-frequency coefficients, and
    combination means for combining the set of corrected transformed coefficients and the original high-frequency coefficients to deliver a set of combined transformed coefficients by giving more weight to the original high-frequency coefficients if high frequencies appear in the set of corrected transformed coefficients, and introducing an attenuation to the original high-frequency coefficients if the high frequencies do not appear in the set of corrected transformed coefficients.

5. A video decoder adapted to deliver decoded digital images and comprising a post-processing device as claimed as in claim 4, suitable for post-processing the decoded digital images in order to deliver post-processed digital pictures.

6. A television receiver adapted to receive digital images and comprising a post-processing device as claimed as in claim 4, suitable for post-processing the digital picture in order to display post-processed digital pictures on a screen of the television receiver.

7. A computer readable storage medium embodying a computer program product for a video decoder comprising a set of instructions which, when loaded into the video decoder, causes the video decoder to:
    transform a set of pixels to a set of transformed coefficients;
    extract original low-frequency coefficients and original high-frequency coefficients from the set of transformed coefficients;
    correct the original low-frequency coefficients for delivering a set of corrected transformed coefficients including corrected low-frequency coefficients; and
    combine the set of corrected transformed coefficients and the original high-frequency coefficients for delivering a set of combined transformed coefficients by giving more weight to the original high-frequency coefficients if high frequencies appear in the set of corrected transformed coefficients, and by introducing an attenuation to the original high-frequency coefficients if the high frequencies do not appear in the set of corrected transformed coefficients.

8. The device of claim 4, wherein the means for extracting extract a first half of the set of transformed coefficients as being the original low-frequency coefficients and a second half of the set of transformed coefficients as being the original high-frequency coefficients.

9. The device of claim 4, wherein the combination means linearly combine corrected high-frequency coefficients included in the set of corrected transformed coefficients and the original high-frequency coefficients so as to deliver the set of combined transformed coefficients.

10. The computer readable storage medium of claim 7, wherein the set of instructions which, when loaded into the video decoder, causes the video decoder to extract a first half of the set of transformed coefficients as being the original low-frequency coefficients and a second half of the set of transformed coefficients as being the original high-frequency coefficients.

11. The computer readable storage medium of claim 7, wherein the set of instructions which, when loaded into the video decoder, causes the video decoder to linearly combine corrected high-frequency coefficients included in the set of corrected transformed coefficients and the original high-frequency coefficients so as to deliver the set of combined transformed coefficients.

* * * * *